US012653113B2

(12) United States Patent
Yehia et al.

(10) Patent No.: US 12,653,113 B2
(45) Date of Patent: Jun. 16, 2026

(54) ARRANGEMENT OF PHOTOVOLTAIC PANELS AND SYSTEM FOR OPTIMIZING ANGULAR POSITIONING OF PHOTOVOLTAIC PANELS IN A GREENHOUSE

(71) Applicant: Ibrahim Yehia, Kafr Qara (IL)

(72) Inventors: Ibrahim Yehia, Kafr Qara (IL); Esther Magadley, Baqa el Gharbiah (IL); Michael Eilan, Clil Steet (IL)

(73) Assignee: Ibrahim Yehia, Kafr Qara (IL)

( * ) Notice: Subject to any disclaimer, the term of this patent is extended or adjusted under 35 U.S.C. 154(b) by 0 days.

(21) Appl. No.: 18/244,261

(22) Filed: Sep. 10, 2023

(65) Prior Publication Data

US 2023/0413741 A1     Dec. 28, 2023

Related U.S. Application Data

(63) Continuation of application No. PCT/IL2022/050202, filed on Feb. 21, 2022, which is
(Continued)

(30) Foreign Application Priority Data

Mar. 10, 2021     (IL) ......................................... 281407

(51) Int. Cl.
| | |
|---|---|
| *A01G 9/24* | (2006.01) |
| *A01G 7/04* | (2006.01) |
| *H02S 20/32* | (2014.01) |

(52) U.S. Cl.
CPC ............... *A01G 9/241* (2013.01); *A01G 7/04* (2013.01); *A01G 9/243* (2013.01); *H02S 20/32* (2014.12)

(58) Field of Classification Search
CPC .......... A01G 9/24; A01G 9/241; A01G 9/243; H02S 20/32; F24S 50/00; F24S 50/20; F24S 50/40; F24S 50/80
See application file for complete search history.

(56) References Cited

U.S. PATENT DOCUMENTS

| | | | | |
|---|---|---|---|---|
| 4,462,390 | A | * | 7/1984 | Holdridge .................. F24J 3/02 |
| | | | | 126/430 |
| 8,915,015 | B1 | | 12/2014 | Augspurger |

(Continued)

FOREIGN PATENT DOCUMENTS

| | | |
|---|---|---|
| CN | 103163904 | 6/2013 |
| CN | 111094866 | 5/2020 |

(Continued)

OTHER PUBLICATIONS

Final Official Action Dated Jan. 31, 2023 from the US Patent and Trademark Office Re. U.S. Appl. No. 17/197,131. (25 pages).
(Continued)

*Primary Examiner* — Joshua J Michener
*Assistant Examiner* — Henry Hooper Mudd

(57) ABSTRACT

An arrangement of photovoltaic panels is configured for installation in a greenhouse having support beams. The arrangement includes frames. Each frame includes at least one photovoltaic panel mounted on a rod. At least one motor is mechanically connected to rotate one or more rods, for bringing each photovoltaic panel to different fixed angular positions. Fittings are arranged at a perimeter of the arrangement. Each fitting is sized and shaped to attach to at least one of the support beams, such that the arrangement is supportable exclusively by the support beams. A system includes at least one such arrangement, a controller, and a plurality of sensors. The controller is programmed to select an optimal fixed angular position for each photovoltaic panel for promoting plant growth, based on environmental and plant
(Continued)

conditions and the sensor outputs, and to instruct each motor to rotate each rod to the selected angular position.

18 Claims, 7 Drawing Sheets

Related U.S. Application Data a continuation of application No. 17/197,131, filed on Mar. 10, 2021, now Pat. No. 11,812,710.

(56) References Cited

U.S. PATENT DOCUMENTS

| | | | |
|---|---|---|---|
| 9,509,247 B1 * | 11/2016 | Holdridge | H01L 31/054 |
| 2010/0263660 A1 | 10/2010 | Thorne | |
| 2014/0283894 A1 * | 9/2014 | Silver | H01L 31/042 |
| 2018/0209162 A1 | 7/2018 | von Behrens et al. | |
| 2020/0163286 A1 * | 5/2020 | Wilde | A01G 9/26 |
| 2020/0196535 A1 * | 6/2020 | Dagondon | A01G 9/18 |
| 2021/0006201 A1 * | 1/2021 | Hinson | H02S 20/32 |
| 2022/0061273 A1 * | 3/2022 | Wolf | A01K 31/20 |
| 2022/0287249 A1 | 9/2022 | Yehia et al. | |

FOREIGN PATENT DOCUMENTS

| | | |
|---|---|---|
| FR | 3060909 | 6/2018 |
| FR | 3065353 | 10/2018 |
| JP | 2016-73100 | 5/2016 |
| JP | 2019-214850 | 12/2019 |
| WO | WO 2018/109151 | 6/2018 |
| WO | WO 2019/180625 | 9/2019 |
| WO | WO 2022/190081 | 9/2022 |

OTHER PUBLICATIONS

International Search Report and the Written Opinion Dated May 4, 2022 From the International Searching Authority Re. Application No. PCT/IL2022/050202. (10 Pages).

Notice of Allowance Dated Jul. 6, 2023 from the US Patent and Trademark Office Re. U.S. Appl. No. 17/197,131. (7 pages).

Office Action Dated Dec. 21, 2022 From the Israel Patent Office Re. Application No. 281407. (3 Pages).

Official Action Dated Sep. 21, 2022 from US Patent and Trademark Office Re. U.S. Appl. No. 17/197,131. (29 pages).

Li et al. "Feasibility Study of a Blind-Type Photovoltaic Roof-Shade System Designed for Simultaneous Production of Crops and Electricity in a Greenhouse", Applied Energy, 279(C): 115853-1-115853-18, Dec. 2020.

Moretti et al. "A Photovoltaic Greenhouse With Variable Shading for the Optimization of Agricultural and Energy Production", Energies, 12(3): 2589-1-2589-15, Jan. 2019.

Office Action Dated Feb. 26, 2024 From the Israel Patent Office Re. Application No. 281407. (7 Pages).

Supplementary European Search Report and the European Search Opinion Dated Feb. 18, 2025 From the European Patent Office Re. Application No. 22766514.8. (13 Pages).

Ezzaeri et al. "The Effect of Photovoltaic Panels on the Microclimate and on the Tomato Production Under Photovoltaic Canarian Greenhouses", Solar Energy, 173: 1126-1134, XP085532968, Aug. 29, 2018.

Notice of Reason(s) for Rejection Dated Oct. 28, 2025 From the Japan Patent Office Re. Application No. 2023-555225 and Its Translation Into English. (11 Pages).

* cited by examiner

High irradiance – maximize shading (+ max. output)

Low irradiance – minimize shading (lower output)

ARRANGEMENT OF PHOTOVOLTAIC PANELS AND SYSTEM FOR OPTIMIZING ANGULAR POSITIONING OF PHOTOVOLTAIC PANELS IN A GREENHOUSE

RELATED APPLICATIONS

This application is a Continuation of PCT Patent Application No. PCT/IL2022/050202 having International filing date of Feb. 21, 2022, which is a Continuation of U.S. patent application Ser. No. 17/197,131 filed on Mar. 10, 2021 and which also claims the benefit of priority of Israel Patent Application No. 281407 filed on Mar. 10, 2021. The contents of the above applications are all incorporated by reference as if fully set forth herein in their entirety.

FILED AND BACKGROUND OF THE INVENTION

The present invention, in some embodiments thereof, relates to an arrangement of photovoltaic panels in a greenhouse, and more specifically, but not exclusively, to a control system in which the photovoltaic panels are configured to rotate, based on sensor outputs and environmental conditions, in order to optimize plant growth.

The lack of sufficient open space for generating electricity from solar energy has led to research in agrivoltaic solutions for providing a dual land use, whereby crops are grown while producing renewable electricity on the same area of land.

SUMMARY OF THE INVENTION

Agrivoltaic solutions to date have focused on fixed photovoltaic installations on greenhouse roofs. These fixed installations have provided certain benefits but also various challenges. First, these installations do not permit adequate lighting in low-irradiance conditions, and therefore must be either be removed in such situations or used with the result of greatly diminished agricultural yield. These installations are similar to other conventional greenhouse shading devices, such as shading nets, which usually have to be removed in winter months to allow higher light levels to reach the crops. Second, conventional systems for installing photovoltaic panels in greenhouses require installation of the panels on top of the roof of the greenhouse. Installation on the roofs is typical, at least in part because systems incorporate heavy panels that rely on the structure of the roof for support. However, panels installed on roofs are challenging to install and remove, especially when it is necessary to remove the panels frequently due to seasonal changes in irradiance. Furthermore, panels installed on greenhouse roofs may require very sturdy and hence heavy mounting systems, in order to operate efficiently in powerful wind conditions. In many countries, photovoltaic panels installed on roofs are required to withstand winds of up to 100 km/h. Moreover, panels made of certain materials installed on greenhouse roofs may exhibit rapid degradation, due to harsh weather conditions and dust accumulation.

The present disclosure discloses a photovoltaic installation for use in a greenhouse. Lightweight photovoltaic panels are rotatably mounted within a greenhouse. The panels are sufficiently light to be supported by an existing support structure for the greenhouse. The panels are thus easy to install and easy to integrate into existing greenhouse structures. A controller receives sensor inputs from sensors measuring environmental conditions for promoting plant growth. The controller selects a rotation angle of the panels so that the panels are arranged at optimum angles for promoting plant growth and, secondarily, for generating solar energy. Thus, the panels never have to be removed, because their orientation is adjusted in a manner that is most advantageous for plant growth. The greenhouse may further include a ventilation system. The controller operates the ventilation system in conjunction with the photovoltaic panels so as to balance the light allowed into the greenhouse with the temperature requirements of the plants within the greenhouse.

According to a first aspect, an arrangement having a plurality of photovoltaic panels and configured for installation in a greenhouse having a roof supported by a plurality of support beams is disclosed. The arrangement includes a plurality of frames, wherein each frame comprises at least one photovoltaic panel mounted on a rod. The arrangement further includes at least one motor. Each respective motor is mechanically connected to rotate one or more respective rods for bringing each photovoltaic panel to a plurality of different fixed angular positions. A plurality of fittings is arranged at a perimeter of the arrangement. Each fitting is sized and shaped to attach to at least one of the plurality of support beams, such that the arrangement is supportable exclusively by the plurality of support beams.

Advantageously, each photovoltaic panel is rotatable through action of the motor on the rod, thus allowing the positioning of the panels to be adjusted in response to required irradiance levels of the crops in the greenhouse, without requiring the panels to be removed. In addition, the panels are installed within the greenhouse, thus protecting the panels from damage. Furthermore, the panels are installed on the existing frame of the greenhouse, without requiring additional structural support for the panels beyond the support beams of the greenhouse itself.

In another implementation according to the first aspect, the support beams comprise arches, and the frames are arranged as cross ties between different arches, to thereby provide increase structural support for the framing members. Advantageously, the arrangement not only is capable of relying on the existing support structure of the greenhouse for its own support, but can also increase the structural stability of the greenhouse.

In another implementation according to the first aspect, each of the frames and rods is made of aluminum. Aluminum is a light-weight material that is suitable for the functions described herein for the frames and rods.

In another implementation according to the first aspect, each respective motor is capable of maintaining the one or more respective rods at up to fifty different fixed angular positions. The high number of angular positions ensures that the panels may be positioned at an optimal angle for plant growth and for energy production.

In another implementation according to the first aspect, a system for optimizing angular positioning of photovoltaic panels in a greenhouse is disclosed. The system includes at least one arrangement of photovoltaic panels according to the first aspect. A controller includes a wireless transceiver. At least one wireless transceiver is associated with each frame and configured to receive instructions from the controller. The system further includes a plurality of sensors. Each of the plurality of sensors is configured to monitor at least one of air temperature, leaf temperature, root temperature, irradiance, humidity, and carbon dioxide concentration at locations within the greenhouse and generate sensor outputs. A plurality of wireless transceivers are configured for transmitting the sensor outputs to the controller. The controller is programmed to select an optimal fixed angular position for each photovoltaic panel for promoting plant growth, based on a combination of environmental and plant conditions and the sensor outputs, and to instruct each respective motor to rotate each one or more respective rods to the selected fixed angular position. Advantageously, the system responds to sensor outputs and environmental conditions so as to position each panel at an optimum position for promoting plant growth and for generating energy.

Optionally, the plurality of sensors include a plurality of sensor units mounted at different heights on vertical posts within the structure, said sensor units configured to monitor air temperature, leaf temperature, irradiance, humidity, and carbon dioxide concentration, and a plurality of root temperature sensors arranged at roots of plants within the greenhouse and configured to monitor root temperature. Placing sensors at different vertical levels enables more accurate assessment of crop requirements for irradiance and temperature.

Optionally, a fan-based ventilation system is installed. The controller is configured to instruct the ventilation system to circulate air within the greenhouse when a temperature sensed by sensor units above plant level is greater than a temperature sensed by sensor units at plant level, and when temperature at plant level is below a predefined optimum temperature for plant growth. Advantageously, the sensors at different vertical levels thus also provide information for control of the ventilation system.

Optionally, the environmental and plant conditions include the opacity of the photovoltaic panels, a range of frequencies of light transmitted through the photovoltaic panels, a current date, a current time of day, a type of crop that is being grown, a date of planting of said crop, a geographic location of the greenhouse, a shape of the greenhouse, a material of a cover of the greenhouse, and a transmittance of the cover of the greenhouse. Based on these inputs, the controller is able to determine a required minimum daily light integral for each crop being grown, the amount of irradiance that is generated due to daily weather conditions, and a corresponding angle for each of the panels needed in order to permit the required amount of light to reach the crops.

Optionally, the sensor outputs include irradiance in various parts of the greenhouse, temperature in various parts of the greenhouse, humidity in various parts of the greenhouse, leaf temperature in various parts of the greenhouse, root temperature in various parts of the greenhouse, and carbon dioxide concentration in various parts of the greenhouse. Each of these outputs is considered by the controller when determining the optimal positioning of the panels.

Optionally, regardless of a status of the sensor outputs, the controller is configured to select a fixed angular position of each of the panels so that each plant within the greenhouse receives a predetermined minimum Daily Light Integral (DLI). The controller thus prioritizes optimal positioning of the panels for plant growth, and only secondarily positions the panels to generate electricity.

Optionally, if the controller determines that a plant did not receive its predetermined minimum DLI in a particular day, the controller is configured to direct the fixed angular position of the panels in at least one subsequent day so as to exceed the predetermined minimum DLI for that subsequent day, so as to achieve cumulatively an average minimum DLI for a series of days. Advantageously, the controller is thus configured to ensure that, over the long run, the crops receive the required amount of light.

Optionally, the system further includes a fan-based ventilation system. The controller is configured to instruct the ventilation system to extract hot air from the top of the greenhouse when a temperature within the greenhouse surpasses a predetermined temperature, and to inject air from outside the greenhouse to an interior of the greenhouse when carbon dioxide levels within the greenhouse decline below a predetermined level. The predetermined temperature and predetermined level are determined based on the environmental and plant conditions. Advantageously, the controller uses the same environmental and plant conditions both to determine the angular position of the panels and to determine operation of the fan-based ventilation system.

Optionally, the environmental and plant conditions include maximum and minimum suitable ranges of temperature and irradiance for each specific growth phase of a crop, and the controller is configured to adjust a level of irradiance of each crop through rotation of the panels, and to adjust a level of temperature of each crop through rotation of the panels and operation of the ventilation system, so as to maintain the temperature and irradiance levels within the suitable ranges. For example, when the environmental and plant conditions dictate that the crops require more irradiation, the controller causes the rods to rotate the panels so as to permit more light therethrough. If, in turn, this causes an increase in temperature beyond an optimal temperature for the crops, the ventilation system cools the greenhouse to the required temperature.

According to a second aspect, a method of optimizing angular positioning of photovoltaic panels in a structure for cultivating plant growth is disclosed. The structure includes a plurality of frames, each frame including at least one photovoltaic panel on a rod. The structure further includes at least one motor. Each respective motor is configured for rotating one or more respective rods and for maintaining the one or more respective rods in a plurality of fixed angular positions. The structure further includes a wireless receiver. The method comprises monitoring, with a plurality of sensors within the structure, at least one of air temperature, leaf temperature, root temperature, irradiance, humidity, and carbon dioxide concentration at locations within the structure, to thereby generate sensor outputs. The method further comprises transmitting the sensor outputs to a controller; selecting, with the controller, an optimal fixed angular position for each photovoltaic panel for promoting plant growth, based on a combination of environmental and plant conditions and the sensor outputs; and instructing the at least one respective motor to rotate the one or more respective rods to the selected fixed angular position. Advantageously, through operation of the method, each panel is angled at an optimum position for promoting plant growth and for generating energy.

In another implementation according to the second aspect, the environmental and plant conditions include an opacity of the photovoltaic panels, a range of frequencies of light let through by the photovoltaic panels, a current date, a current time of day, a kind of crop that is being grown, a date of planting of said crop, a geographic location of the structure, a shape of the structure, a material of a cover of the structure, and a transmittance of the cover of the structure. Based on these inputs, the controller is able to determine a required minimum daily light integral for each crop being grown, the amount of irradiance that is generated due to daily weather conditions, and a corresponding angle for each of the panels needed in order to permit the required amount of light to reach the crops.

In another implementation according to the second aspect, the sensor outputs include irradiance in various parts of the structure, temperature in various parts of the structure, humidity in various parts of the structure, leaf temperature in various parts of the structure, root temperature in various parts of the structure, and carbon dioxide concentration in various parts of the structure. Each of these outputs is considered by the controller when determining the optimal positioning of the panels.

In another implementation according to the second aspect, the method further comprises, regardless of a status of the sensor outputs, selecting a fixed angular position of each of the panels so that each plant within the structure receives a predetermined Daily Light Integral (DLI). The method thus prioritizes optimal positioning of the panels for plant growth, and only secondarily positions the panels to generate electricity.

Optionally, the method further comprises, if the controller determines that a plant did not receive its predetermined minimum DLI in a particular day, directing the fixed angular position of the panels in at least one subsequent day so as to exceed the predetermined minimum DLI for that subsequent day, so as to achieve cumulatively an average minimum DLI for a series of days. Advantageously, over the long run, the crops receive the required amount of light.

In another implementation according to the second aspect, the structure is a greenhouse and further includes a fan-based ventilation system. The method further comprises instructing the ventilation system to extract hot air from the top of the greenhouse when a temperature within the greenhouse surpasses a predetermined temperature, and to inject air from outside the greenhouse to an interior of the greenhouse when carbon dioxide levels within the greenhouse decline below a predetermined level. The predetermined temperature and predetermined level are determined based on the environmental and plant conditions. Advantageously, the controller uses the same environmental and plant conditions both to determine the angular position of the panels and to determine operation of the fan-based ventilation system.

Optionally, the environmental and plant conditions include maximum and minimum suitable ranges of temperature and irradiance for each specific growth phase of a crop. The controller is configured to adjust a level of irradiance of each crop through rotation of the panels and operation of the ventilation system, so as to maintain the temperature and irradiance levels within the suitable ranges. For example, when the environmental and plant conditions dictate that the crops require more irradiation, based on the growth phase of the crop, the controller causes the rods to rotate the panels so as to permit more light therethrough. If, in turn, this causes an increase in temperature beyond an optimal temperature for the crops, the ventilation system cools the greenhouse to the required temperature.

Optionally, the method further comprises, as a secondary consideration to optimizing the fixed angular position of each panel for promoting plant growth, adjusting the fixed angular position of each panel so as to track movement of the sun. Tracking movement of the sun maximizes the energy output of the panels. The method prioritizes optimal positioning of the panels for plant growth, and only secondarily positions the panels to generate electricity.

Optionally, the structure is an open frame arranged over open field crops, the plurality of sensors comprise one or more anemometers, and the method further comprises: detecting wind speed and direction with the one or more anemometers; determining that the detected wind speed and direction exceed a maximum tolerance for wind speed according to the environmental conditions and current fixed angular position of at least one panel; and instructing rotation of the at least one panel to a different fixed angular position. When the structure is an open frame, the panels are exposed to wind, and the wind may damage the panels if the panels are exposed to wind forces higher than a predetermined level. Moving the panels, to minimize wind loads on the panels if the wind speed is above a predetermined level, helps ensure that the panels remain secure under adverse weather conditions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the present disclosure are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the present disclosure may be practiced.

In the drawings.

DESCRIPTION OF SPECIFIC EMBODIMENTS OF THE INVENTION

Figure 1:
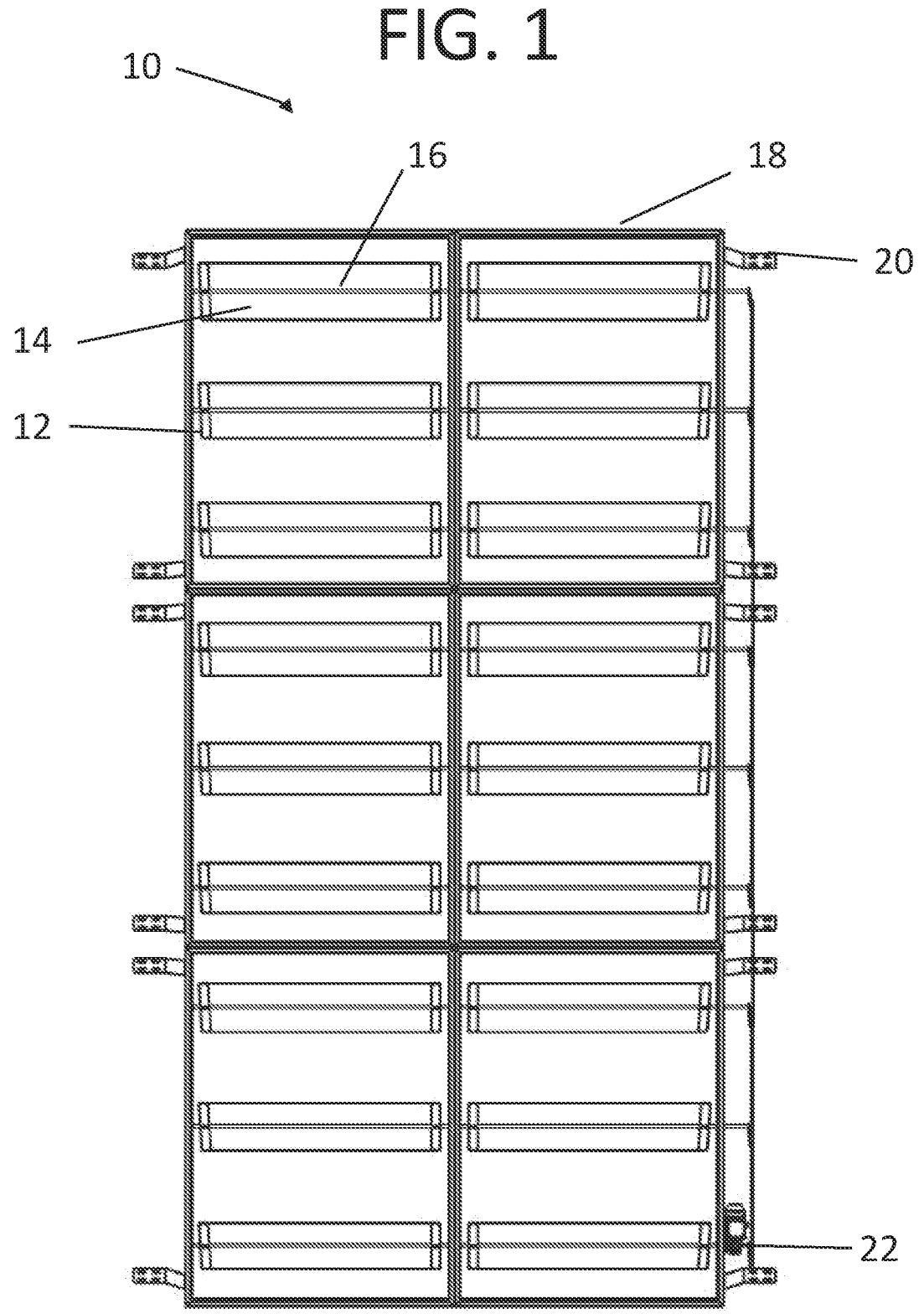
FIG. 1 is a top view of an arrangement of photovoltaic panels, according to embodiments of the present disclosure.

The present invention, in some embodiments thereof, relates to an arrangement of photovoltaic panels in a greenhouse, and more specifically, but not exclusively, to a control system in which the photovoltaic panels are configured to rotate, based on sensor outputs and environmental conditions, in order to optimize plant growth.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

Figure 2:
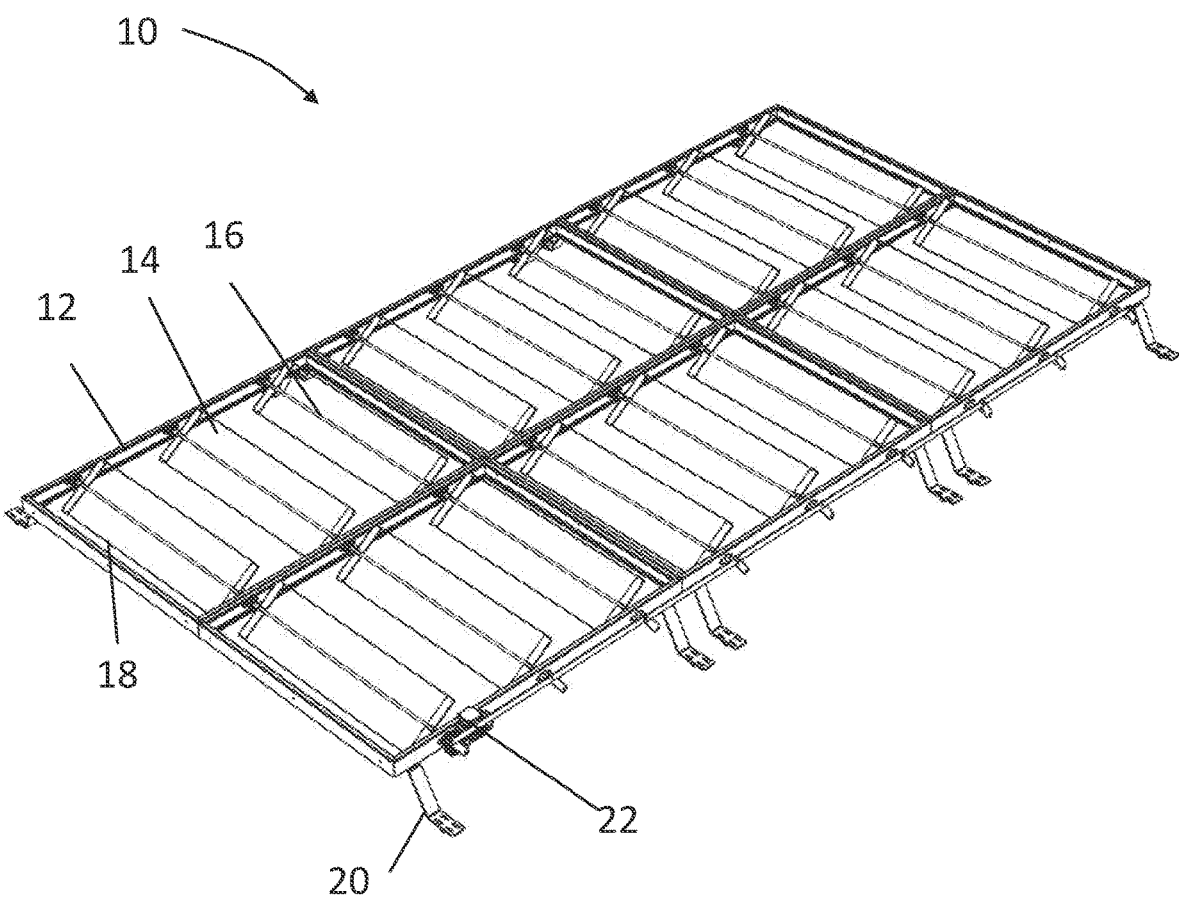
FIG. 2 is an upper perspective view of the arrangement of FIG. 1, according to embodiments of the present disclosure.
Figures 3, 4:
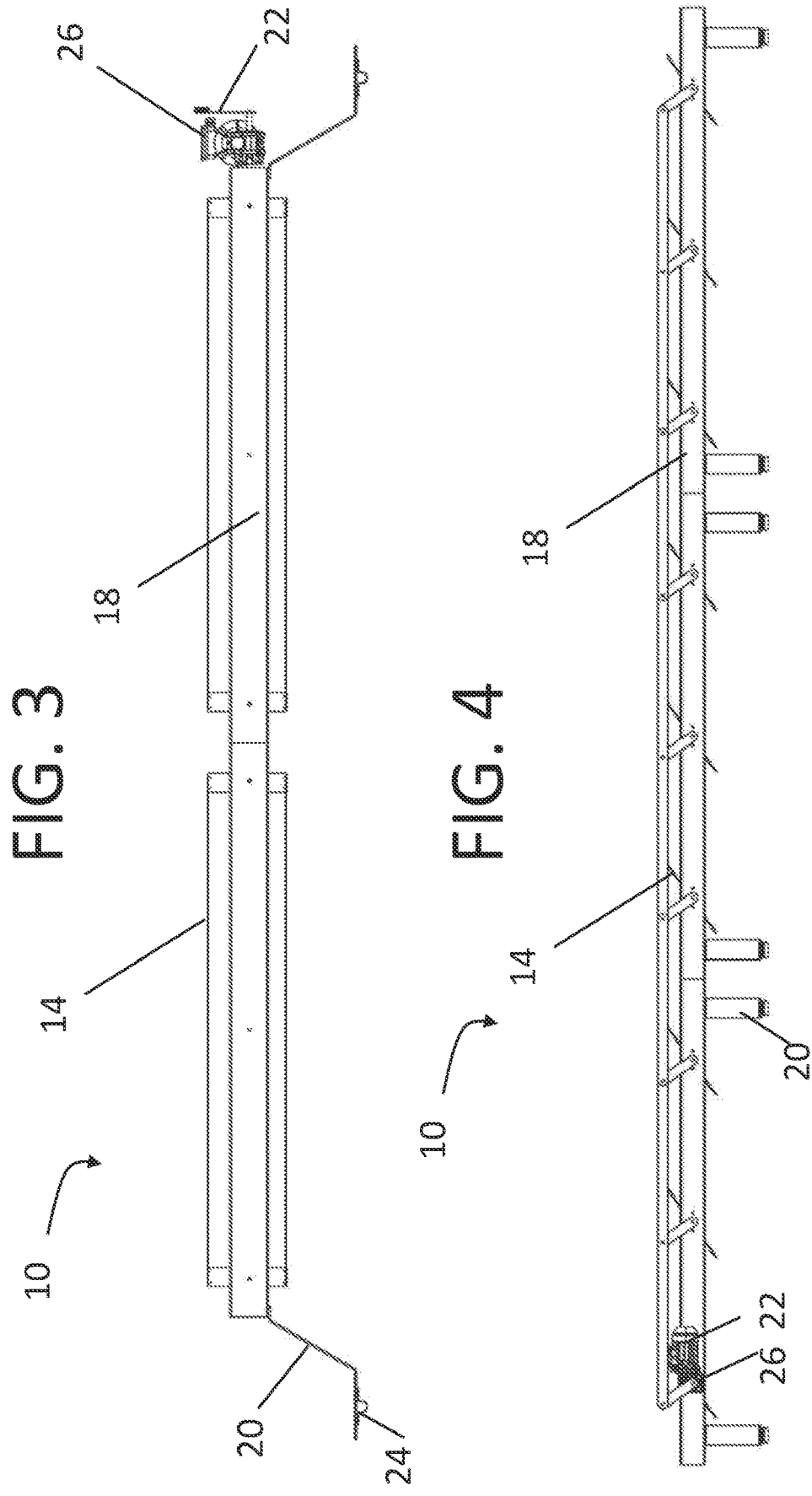
FIG. 3 is a front view of the arrangement of FIG. 1, according to embodiments of the present disclosure.
FIG. 4 is a side view of the arrangement of FIG. 1, according to embodiments of the present disclosure.

Referring to FIGS. 1-4, arrangement 10 of photovoltaic panels is configured to be installed in a structure for cultivating plant growth, such as a greenhouse. Arrangement 10 may also be referred to herein as a module. FIG. 1 illustrates a top view of arrangement 10, FIG. 2 illustrates an upper perspective view of arrangement 10, FIG. 3 illustrates a front view of arrangement 10, and FIG. 4 illustrates a side view of arrangement 10.

As used in the present disclosure, the term "structure for cultivating plant growth" encompasses a greenhouse and an open-frame structure arranged in a field. As used in the present disclosure, the term "greenhouse" refers to a structure with walls and roof made chiefly of transparent material, such as glass, polyethylene, or another type of plastic, in which plants requiring regulated climatic conditions are grown. A greenhouse includes a frame made of support beams, and a cover and/or wall and roof panels of transparent material which are supported by the support beams. The arrangement 10 may be installed in a greenhouse having any shape and made of any materials. For example, the greenhouse may have one of the following shapes: flat arch, dome, tunnel, Quonset, Gothic arch, gable, skillion, lean-to, even span, uneven span, ridge and furrow, A-frame, or sawtooth. In the alternative, arrangement 10 is arranged over open field crops. In such embodiments, a frame is built over the open field crops for supporting arrangement 10. The frame is an open-frame built on an open field, meaning that there are no glass or plastic panels supported by the open-frame. In some such embodiments, the frame is built solely to support arrangement 10.

In addition, as used in this disclosure, the term "support beams" includes all materials that are used to support a frame for a greenhouse or another structure for cultivating plant growth, including, but not limited to arches, purlins, rafters, braces, vertical beams, wooden frame members, pipe frame members, and steel or iron trusses.

Arrangement 10 includes one or more frames 12. In exemplary embodiments, each frame 12 is rectangular and has dimensions of approximately 1.5×2 m. Each frame 12 includes at least one photovoltaic panel 14 mounted on a rod 16. Frame members 18 are arranged at a perimeter of each frame 12, so as to enclose the photovoltaic panels 14. Each frame 12 also includes at least one fitting 20 attached to one or more frame members 18. The fittings 20 are sized and shaped to be attached to support beams of a greenhouse or of another structure for cultivating plant growth. Fittings 20 may also be adjustable to different lengths, to account for minor variations between dimensions of frame members 18 and the support beams. In exemplary embodiments, fittings 20 include telescopic rods 23. Connectors 24 are attached to the telescopic rods 23 and may be located at, and fitted around, the support beams. In the illustrated embodiments, connectors 24 are omega-shaped, but they may take any other suitable shape as well. Optionally, connectors 24 are also adjustable in dimension. In addition or alternatively to the connectors 24 being located on fittings 20, the omega-shaped connectors other attachment means are attached to the support beams of the greenhouse, and fittings 20 are fitted within the omega-shaped connectors or otherwise attached to the attachment means.

Each panel 14 is connected to a wiring system inside hollow sections of frame members 18. Depending on the size of the arrangements 10 and electrical requirements, the frames 12 are connected either in series or in parallel to a micro-inverter (not shown) attached to each arrangement 10. The micro-inverter feeds power to an energy grid of the greenhouse for use within the greenhouse. Optionally, the energy grid includes a battery system, and is the sole power source for the electrical devices of the greenhouse, such as the sensors and ventilation system, which be discussed further herein. Optionally, the micro-inverter is connected to an external electrical power grid, for delivery of power outside of the greenhouse.

In preferred embodiments, arrangement 10 is designed to be installed within an existing greenhouse. For example, in FIG. 5, arrangement 10 is shown installed within tunnel-shaped greenhouse 30. To that end, arrangement 10 is designed to be a modular plug-and-play system, with the number of frames 12, and the number of panels 14 per frame 12, capable of being varied according to the dimensions of the existing greenhouse. In the illustrated embodiments, the arrangement 10 includes six frames 12, and each frame 12 includes three photovoltaic panels 14. This number of frames 12 and number of panels 14 per frame 12 is merely exemplary, and any number of frames 12 and panels 14 may be used. The number of frames 12 may be limited based on pragmatic considerations. One such consideration may be structural limitations of the support beams of the greenhouse, i.e., the capacity of the support beams to bear the weight of the frames 12. Another such consideration may be maximum shading tolerances of the greenhouse, i.e., too many frames would cause an impractically high amount of shading, regardless of the angles of the panels 14.

In addition, in preferred embodiments in which the arrangement 10 is installed in an existing greenhouse, arrangement 10 is supportable exclusively by the support beams of the greenhouse. That is, it is not necessary to introduce any additional structural supports into the greenhouse solely for the purpose of supporting arrangement 10. For example, in FIG. 5, arrangement 10 is attached to, and supported by, arches 32 of greenhouse 30. In addition or in the alternative, when the greenhouse frame members include horizontal arch supports, the fittings 20 may be attached to those horizontal arch supports.

Figure 5:
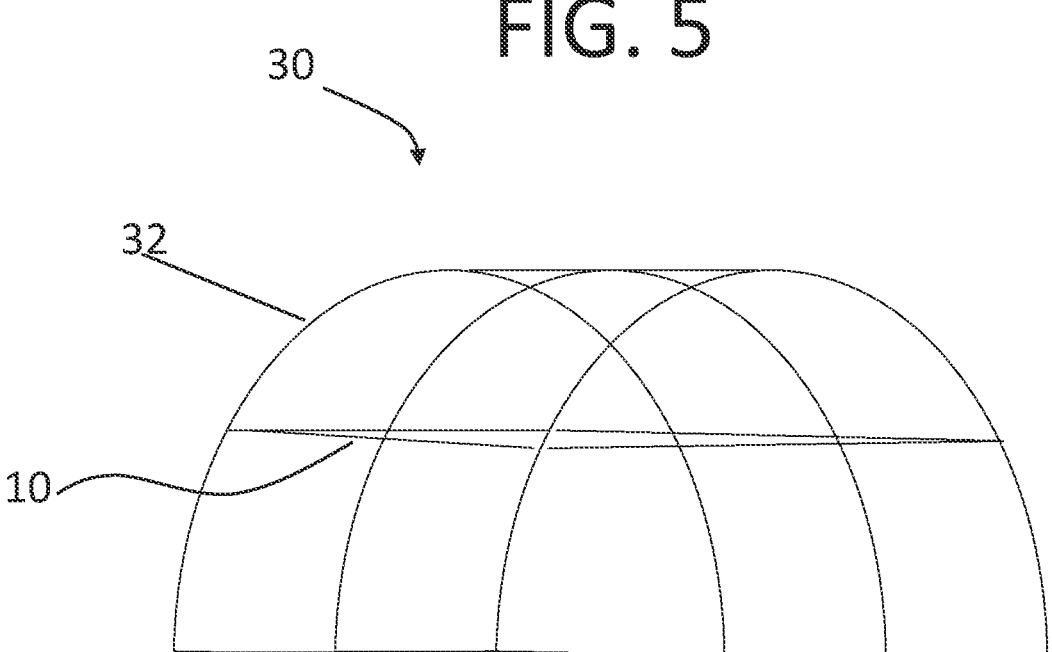
FIG. 5 schematically depicts the arrangement of FIG. 1 mounted within a frame of a greenhouse, according to embodiments of the present disclosure.

In exemplary embodiments, and as illustrated in FIG. 5, the frames 12 are arranged as cross ties between different arches 32. Advantageously, in this configuration, the frames 12 provide increased structural support for the framing members.

To enable arrangement 10 to be supported fully by support beams of a greenhouse 30, the materials of arrangement 10 are preferably lightweight. For example, rods 16 and frame members 18 may be made of aluminum.

Similarly, panels 14 are preferably made of a lightweight photovoltaic material. Almost 90% of solar panels used on roofs presently are made from polycrystalline silicon. Polycrystalline silicon panels weigh 20 to 30 kilograms per square meter, and thus often require additional support members in order to distribute their weight. Monocrystalline silicon panels have a comparable weight. While polycrystalline or monocrystalline silicon may be used in the panels 14 of the present disclosure, their weight makes it challenging to install such panels within an existing frame of a greenhouse, without additional support.

More recently, alternative photovoltaic materials have been developed that are significantly lighter and thus better adapted for installation within an existing greenhouse. For example, organic photovoltaic materials (OPVs) are photovoltaic materials that include carbon-containing molecules. Organic photovoltaic materials are also known as plastic solar cells. OPVs weigh around 500 grams per square meter, making them more than 40 times lighter than their crystalline silicon equivalents. In addition, OPVs may be only a few millimeters thick, which is much thinner than crystalline silicon solar cells. Another advantage of OPVs is that they are semi-transparent, thus permitting some light therethrough even when laid completely perpendicular to the sun's rays. In addition to OPVs, other lightweight photovoltaic materials that may be used in panels 14 include, but are not limited to: perovskite solar cells; dye-sensitized solar cells, and amorphous thin-film silicon solar panels.

Installing the arrangements 10 within the greenhouse, as opposed to on the roof of the greenhouse, has numerous advantages. First, panels mounted on top of a greenhouse roof exhibit more rapid degradation, compared to panels that are within the greenhouse. Causes of degradation for externally-mounted panels include dust and harsh weather conditions. Thus, panels within the greenhouse enjoy increased lifetime and improved performance.

Turning back to FIG. 2, panels 14 are rotatable relative to frame 12. Specifically, each panel 14 is separately rotatable through rotation of a corresponding rod 16 on which it rests. Each rod 16 may be fitted within a frame 12 using bearing fittings and may be rotatable within that fitting. In exemplary embodiments, the rods 16 are connected to at least one motor 26, which may be an AC motor. Each rod 16 is controlled by a single motor 26, while each motor 26 controls one or more rods 16. The motor 26 is configured to adjust levers on the sides of frames 12 which are connected to the rods 16. The levers rotate rods 16 to a desired angle. The motor 26 may operate levers through any mechanical connection known to those of skill in the art, for example, through gears, cams, linear actuators, and rotary actuators. The levers are capable of maintaining rods 16 in a large number of different angular positions relative to a plane of frame 12. In exemplary embodiments, the rods 16 may be maintained in up to fifty different angular positions. Each motor 26 is connected to a transceiver 22, whose location is indicated schematically, for receiving instructions regarding how to orient the panels 14.

The number of rods 16 controlled by each motor may vary. In some embodiments, a single motor controls all rods 16 in a given frame 12. Optionally, in such embodiments, every panel 14 within a frame 12 is necessarily moved in unison and oriented at the same angle. In other embodiments, a single motor controls rods 16 of multiple frames 12. In such embodiments, a separate gear system connects from the motor to each frame 12, so that panels 14 of some frames 12 may be oriented differently from panels 14 of other frames 12.

Figure 6:
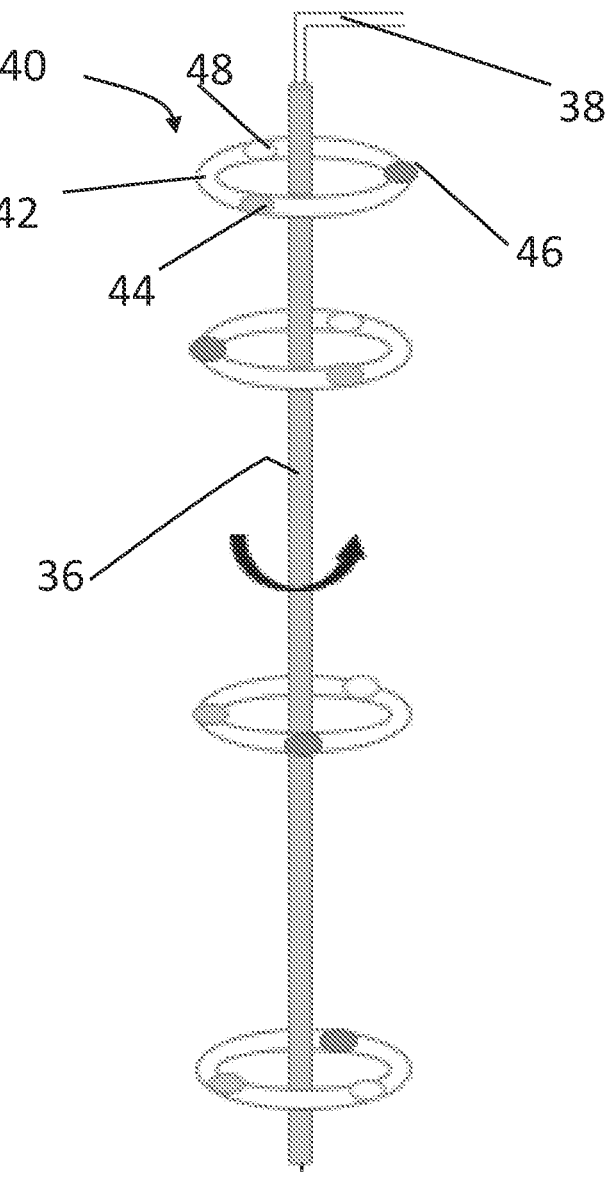
FIG. 6 schematically depicts a vertical post with a plurality of sensor units at different heights thereon, according to embodiments of the present disclosure.
Figure 7:
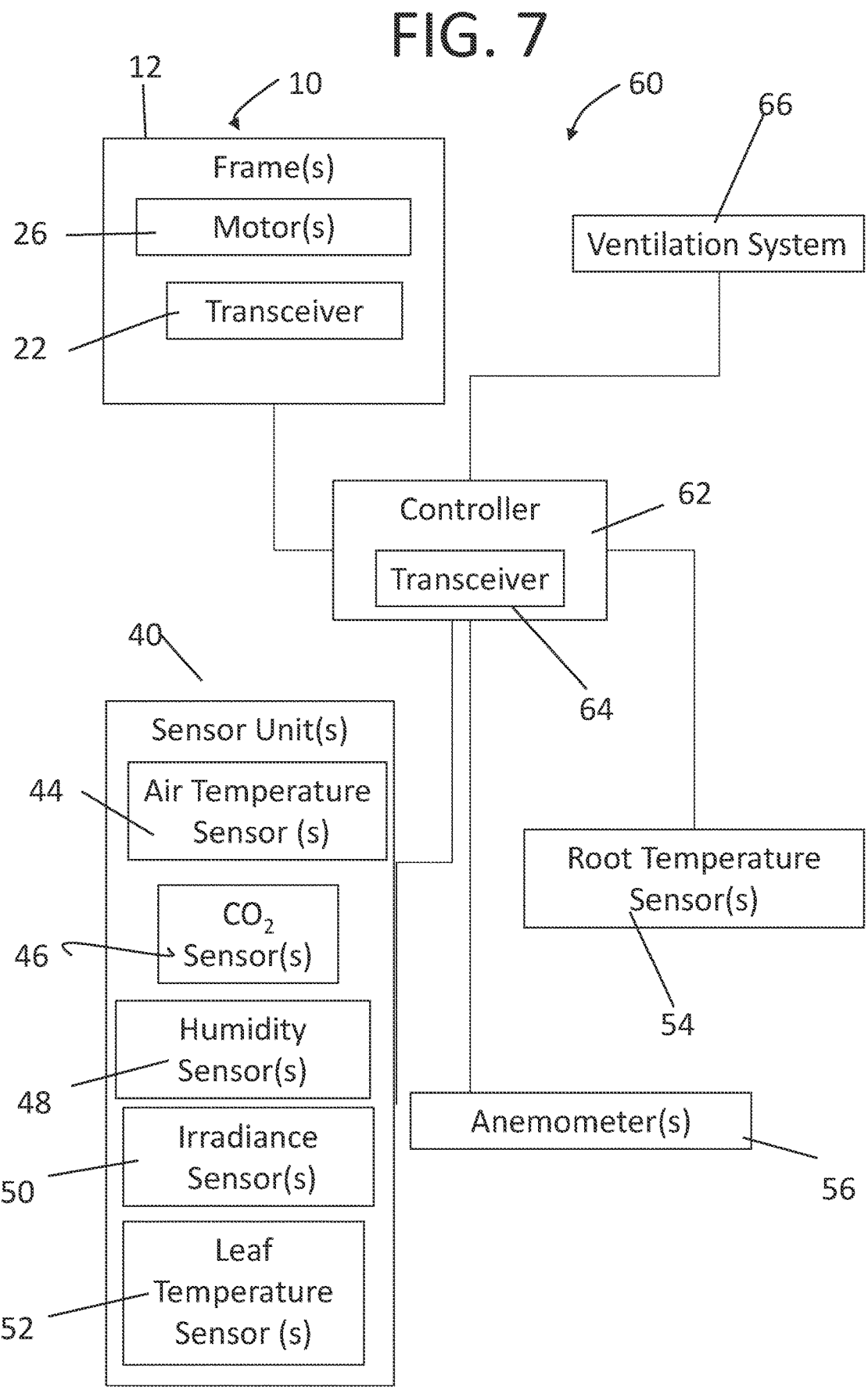
FIG. 7 is a block diagram illustrating different components of a system for controlling the arrangement of photovoltaic panels of FIG. 1, according to embodiments of the present disclosure.

Referring now to FIG. 6 and FIG. 7, a plurality of sensor units 40 are installed on vertical posts 36 in the greenhouse or other structure for cultivating plant growth. The sensor units 40 are arranged at different heights on the vertical posts 36, in order to enable sensing of environmental conditions at different heights within the greenhouse's microclimate. Optionally, posts 36 are rotatable, so that each sensor within a given sensor unit 40 may collect data from different locations around post 36. FIG. 6 shows a schematic embodiment of a sensor unit 40, which includes a base 42, an air temperature sensor 44, a carbon dioxide concentration sensor 46, and a humidity sensor 48. As shown in FIG. 7, sensor unit 40 may also include an irradiance sensor 50. In addition to one or more irradiance sensors 50 being located at plant height, at least one irradiance sensor 50 is located above the height of frames 12. The irradiance sensors 50 above the height of panels 14 measure changes of irradiance as a result of different weather conditions, while the irradiance sensors 50 at plant height measure the effective irradiance reaching each plant. Sensor unit 40 may further include a leaf temperature sensor 52. For example, a temperature probe may extend from base 42 and be placed on a leaf at an equivalent height to sensor unit 40. In addition to being included in a sensor unit 40, each of the above-described sensors may alternatively be fixed separately within the greenhouse and separately send wireless sensor outputs to the transceiver 64 of controller 62.

Wiring 38 provides power to each of the sensors. In the illustrated embodiments, wiring 38 is within a hollow portion of post 36; however, wiring 38 may be in any other convenient location. Optionally, wiring 38 also includes a data transfer cable for communicating sensor outputs to a controller 62. In addition or in the alternative, each post 36, or each sensor unit 40, is equipped with a transceiver for communicating sensor outputs to controller 62.

FIG. 7 is a block diagram illustrating different components of a system 60 for optimizing angular positioning of photovoltaic panels 14 within a greenhouse or other structure for cultivating plant growth. System 60 includes at least one arrangement 10, including, inter alia, one or more frames 12, one or more motors 26, and one or more transceivers 22. A controller 62 includes a transceiver 64. Transceiver 64 is configured to receive wireless transmissions from corresponding transceivers from sensor units 40. In addition to the above-mentioned sensors, the system 60 also includes one or more root temperature sensors 54, which are configured at roots of one or more crops growing within the structure for cultivating plant growth. When the structure is an open-frame structure, the system 60 further includes at least one anemometer 56, for measuring wind direction and speed. The types of sensors that may be included in system 60 are not limited to the above-described examples, and other types of sensors may likewise be included.

System 60 may further include a ventilation system 66, for example a fan-based ventilation system. Ventilation system 66 may be configured to, inter alia, circulate air within a greenhouse, extract air from the greenhouse, and exchange air between the greenhouse and an outside environment, as will be discussed further below. The controller 62 may communicate instructions to ventilation system 66 via transceiver 64.

Controller 62 may be a programmable logic controller including processing circuitry. The processing circuitry may include a computer readable storage medium (or media) having computer readable program instructions thereon for causing a processor to carry out aspects of the present invention. The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the processing circuitry, partly on the processing circuitry, as a stand-alone software package, partly on the processing circuitry and partly on a remote computer or entirely on the remote computer or server. In the latter scenario, the remote computer may be connected to the processing circuitry through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Controller 62 includes a memory. The memory may be pre-loaded with a library of data pertaining to the optimum growing conditions for various crops and/or strains of crops at various stages of growth. These include the minimum and maximum desired ranges of irradiance in the Photosynthetically Active Radiation (PAR) range, temperature, humidity, $CO_2$ levels, and other dynamic factors that change during the day and/or season. A database of sun positions at different times of the day and year is also preloaded for different locations.

In operation of system 60, one or more of the sensors (e.g., air temperature sensor 44, carbon dioxide concentration sensor 46, humidity sensor 48, irradiance sensor 50, leaf temperature sensor 52, root temperature sensor 54, anemometer 56, and/or any other installed sensor) generates sensor outputs and transfers the sensor outputs to controller 62. The controller 62 selects an optimal fixed angular position for each photovoltaic panel 14 for promoting plant growth. This selection is based on the sensor outputs and a combination of environmental and plant conditions. The controller 62 then instructs each motor 26 to rotate each respective rod 16 to the selected fixed angular position. As discussed above, in exemplary embodiments, the panels 14 may be moved to pre-programmed angles of up to 50 steps per day.

The environmental and plant conditions considered by the controller 62 when determining the angular position of panels 14 may include static factors and dynamic factors. The static factors may include the type of photovoltaic material used in panels 14, an opacity of the photovoltaic panels 14 (for example, when the photovoltaic panels are semi-transparent, as in the case of organic photovoltaic panels); and a range of frequencies of light let through by the photovoltaic panels 14. The static factors may further include a current date, for example, whether the day is a summer day with a longer daylight period or a winter day with a shorter daylight period, and a current time of day, which, in turn, affects the angle of the sun on the greenhouse. Another static factor is the kind of crop that is being grown, and, when appropriate, the strain of the crop that is being grown. Different crops thrive under different conditions for carbon dioxide concentration, irradiance, temperature, and humidity. In addition, another relevant static factor is a date of planting of said crop, insofar as optimum growing conditions vary according to the growth stage of a plant. A fifth relevant static factor is geographic location of the structure, which dictates the amount and timing of sunlight received by the structure at any given day. The geographic location may be defined to a high degree of accuracy, for example to an arc second resolution. Relatedly, the controller 62 may consider other factors associated with the structure itself, such as a shape of the structure (e.g., any of the greenhouse shapes listed above); a material of a cover of the structure, if any (e.g., glass, polyethylene, or another plastic), and a transmittance of the cover of the greenhouse.

In addition, the controller 62 considers various dynamic factors that are quantified by the sensor outputs. The dynamic factors may include irradiance in various parts of the structure, temperature in various parts of the structure, humidity in various parts of the structure; leaf temperature in various parts of the structure; root temperature in various parts of the structure, and carbon dioxide concentration in various parts of the structure.

Figure 8:
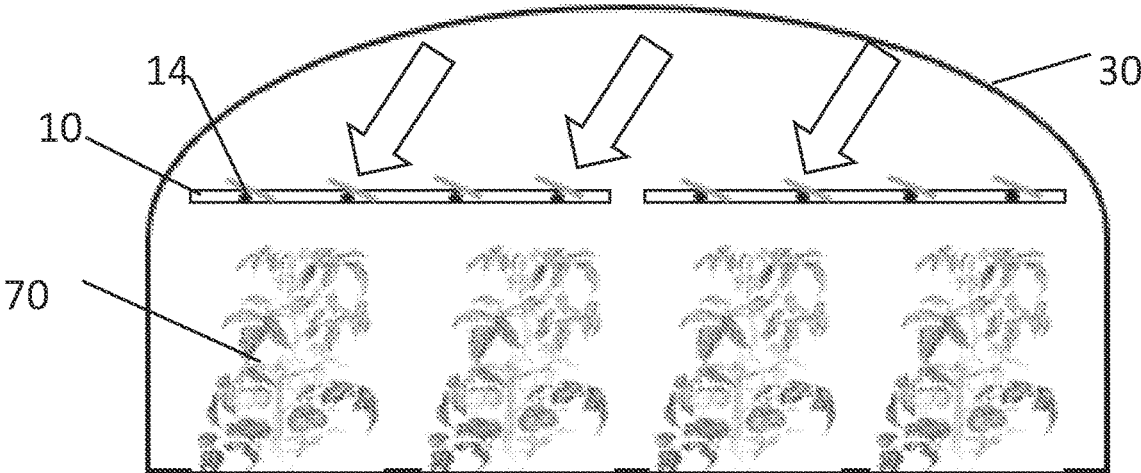
FIG. 8 schematically depicts changing of an angle of photovoltaic panels in the arrangement of FIG. 1 based on differences in irradiance conditions, according to embodiments of the present disclosure.
Figure 8:
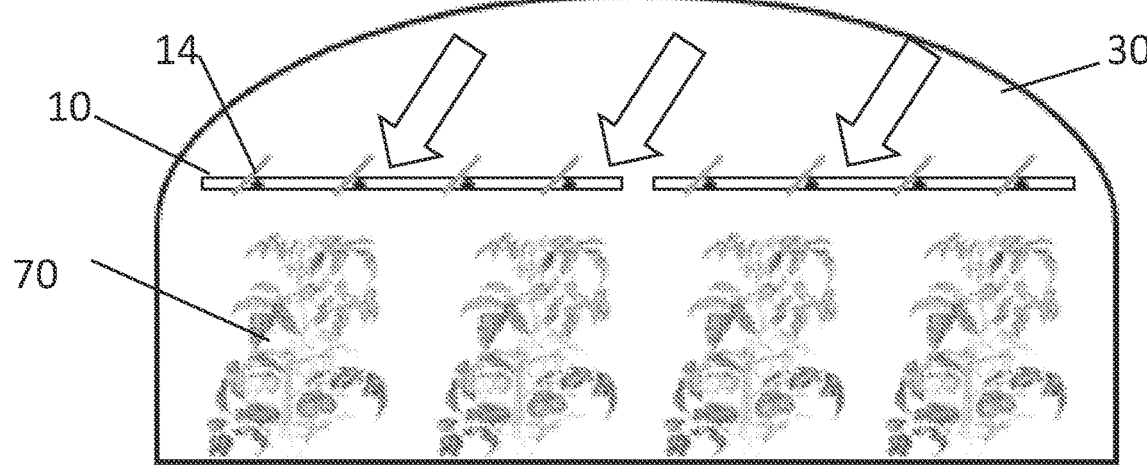

FIG. 8 schematically illustrates the effect of controlling the angle of panels 14 within greenhouse 30. The maximum level of irradiation is when the panels are at a solar incidence of 90°, or in other words parallel to the sun, allowing all the sunlight to enter the greenhouse. The minimum level of irradiation is when the panels are at a solar incidence of 0°, blocking the sunlight. In the upper illustration, panels 14 are oriented perpendicular to the sun's rays, represented by the arrows. As a result, a lesser amount of sunlight reaches plants 70. This orientation is suitable for a situation in which there is high irradiance, in excess of what is needed for plant growth. The panels 14 are tilted so as to provide maximum shading for the plants 70 as well as maximum electrical output generated by the photovoltaic panels 14. In the lower illustration, the panels 14 are oriented parallel to the sun's rays, allowing a maximum amount sunlight to pass through arrangement 10 and reach plants 70. Conversely, a minimum amount of electricity is generated by panels 14. This orientation is suitable for a situation in which there is low irradiance, such that all of the irradiance provided by the sun is directed to the plants 70 for promoting plant growth.

Optionally, regardless of a status of the sensor outputs, the controller 62 is configured to select a fixed angular position of the panels 14 so that each plant within the structure receives a predetermined minimum Daily Light Integral (DLI). As used in the present disclosure, the term "Daily Light Integral" refers to a number of photosynthetically active photons (individual particles of light in the 400-700 nm range) accumulated in a square meter over a 24-hour period. DLI is usually expressed as moles of photons per square meter per day ($mo\,l\cdot m^{-2}\cdot d^{-1}$). Typically, plants require a minimum DLI of at least 5 $mo\,l\cdot m^{-2}\cdot d^{-1}$, up to a maximum requirement of 20 $mo\,l\cdot m^{-2}\cdot d^{-1}$. The target DLI, required by a growing plant may depend on specific circumstances of the plant itself, such as the type of plant and the stage of growth of the plant. For example, vegetative cuttings may have a target DLI of 4-6 in their early growth stages, and a target DLI of 6-10 in their later growth stages. For ease of user control, the controller 62 may set a scale of DLI from 1 to 10, with 1 being the lowest target DLI and 10 being the highest target DLI.

Accordingly, in exemplary embodiments, controller 62 is programmed to control the positioning of the panels 14 so that each plant receives a predetermined minimum DLI over the course of a day, based on the type of crop and the growth stage. Once the controller 62 determines that the target DLI has been reached, for example, based on input from irradiance sensors 50 at plant level, the controller 62 then instructs the motors 26 to rotate the panels 14 so as to maximize generation of electricity. For example, the controller 62 may instruct the motors 26 to rotate the panels 14 so that the panels 14 track the sun, i.e., that they are always oriented perpendicular to the sun's rays as illustrated in the upper half of FIG. 8.

Notably, the consideration of maximizing generation of electricity is a secondary consideration. The primary consideration in operation of controller 62 is promoting plant growth. While solar tracking systems for photovoltaic panels are known, such existing tracking systems are designed solely to maximize electrical yield, by directing the photovoltaic panels toward the sun. Such devices change their orientation through the day to follow the sun's path to minimize the angle of incidence (the angle that a ray of light makes with a line perpendicular to the surface) between the incoming light and the panel, which increases the amount of energy the installation produces. These devices typically achieve this result by attaching movable panels to electric motors that move according to input from irradiance sensors. The systems may be single-axis, in which the sun is tracked from east to west over the course of a day, or two-axis, in which the sun is tracked on a vertical axis as well.

In system 60, the tracking system follows the sun on one axis, but its movements are regulated by additional factors. These factors are those that determine the agricultural output of the crop grown in greenhouse 30, both in terms of quantity and quality, as discussed above. Crop performance is the top priority for system 60, rather than electrical output.

In the event that the controller 62 determines that a plant did not receive its predetermined minimum DLI in a particular day or series of days (for example, because those days were heavily overcast), the controller 62 may be configured to direct the fixed angular position of the panels in at least one subsequent day so as to exceed the predetermined minimum DLI for that subsequent day. For example, if the predetermined minimum DLI is 10, and on one day the controller 62 determines that the plants received a DLI of 5, on the next day the controller 62 may instruct opening of the panels 14 so as to achieve a minimum DLI of 15, or any other suitable DLI, subject to known saturation limits. As a result, cumulatively, an average minimum DLI is achieved for a series of days.

In addition to ensuring that each plant receives a minimum DLI, controller 62 may also be programmed to regulate temperature. Temperature is regulated either by increasing shading to reduce temperatures or by decreasing shading to allow penetration and trapping of more irradiance.

Each greenhouse crop has maximum and minimum recommended ranges of temperature and irradiance for each specific growth phase. Similar to the irradiance levels, the temperature ranges may be graded from 1 to 10, with 1 marking the minimum level of desired temperature and 10 the maximum level of desired temperature. Some crops, at some growth stages may be either more tolerant or more vulnerable to either excess heat or excess irradiation. The controller 62 is programmed to optimize the irradiance and temperature to improve crop outcomes.

As discussed above in connection with FIG. 7, system 60 further includes fan-based ventilation system 66. Controller 62 is configured to operate the ventilation system in order to control temperature and carbon dioxide levels in the greenhouse 30. For example, when air temperature sensors 44 arranged at plant levels indicate that the temperature is below a predefined optimum temperature for plant growth, but air temperature sensors 44 arranged on sensor units 40 that are above plant level indicate that the temperature is higher, the controller 62 instructs the ventilation system 66 to circulate air within the greenhouse 30, so that the warmer air is circulated down to plant level. This scenario may typically occur in the winter. As another example, when the temperature within a greenhouse 30 surpasses a predetermined temperature, the controller 62 is configured to instruct the ventilation system 66 to extract hot air from the top of the greenhouse 30. As yet another example, the controller 62 may instruct the ventilation system 66 to inject air from outside the greenhouse 30 to an interior of the greenhouse when carbon dioxide levels within the greenhouse 30 decline below a predetermined level. These predetermined temperature and predetermined level of carbon dioxide may be determined based on the environmental and plant conditions discussed above.

In addition, controller 62 may operate ventilation system 66 in concert with motors 26 so as to balance ideal temperature and irradiance conditions for the plants growing in the greenhouse 30. For example, the controller 62 may be programmed to reach a target irradiance (DLI) and to maintain the air temperature between set maximum and minimum. These target ranges may be set according to each specific growth phase of a crop. Controller 62 is configured to adjust a level of irradiance of each crop through rotation of the panels 14, and to adjust a level of temperature of each crop through rotation of the panels 14 and operation of the ventilation system, so as to maintain the temperature and irradiance levels within the suitable ranges.

The following examples illustrate operation of the controller 62 for adapting to desired irradiance and temperatures, in a system in which irradiance and temperature are measured on a 1 to 10 scale. Crop A may be more vulnerable than crop B to higher temperatures at early growth stages, but is less sensitive to levels of irradiation at the higher levels of the recommended range. In later stages of growth, crop A is more vulnerable to higher levels of irradiation. In such a case, from day 1 to day 45 after planting, controller 62 is programmed to turn on cooling fans of ventilation system 66 when temperature reaches level 5 of the recommended range but to leave the photovoltaic panels 14 at full tracking capacity at 0° to the sun, until level 8 of the recommended irradiance range is reached. Panels 14 are then turned to 45° from the sun until level 10 is reached, when the panels are turned to 90° to the sun, to maximize generation of electricity. After day 45 from planting, the system 60 is programmed to turn the panels to 90° to the sun after irradiance reaches level 4, and to operate cooling fans without reference to irradiance levels.

Crop B, on the other hand, might be equally sensitive to both high irradiance and temperature at all stages of growth. In this case, controller 60 is programmed to start reducing irradiance and temperature once both inputs reach level 2 of the recommended range.

Referring again to FIG. 7, and as discussed above, system 60 may be installed in an open frame structure over open field crops. An advantage of installing system 60 over open field crops is that a larger number of panels 14 may be deployed. Conversely, however, the panels 14 are exposed to adverse environmental conditions. In particular, because panels 14 are lightweight, they are especially prone to damage from high winds. Accordingly, in embodiments of system 60 that are installed in an open frame structure, the sensors include one or more anemometers 56. A method of operating system 60 in the open frame structure includes detecting wind speed and direction with the anemometers 56. The wind exerts different torque on the panels 14, depending on the angular position of the panels 14, the wind direction, and the wind speed. The controller 62 is pre-programmed with a maximum torque tolerance of the panels 14. If the controller 62 determines that the detected wind speed and direction exceed a maximum tolerance for wind speed of the panels 14 in their current orientation, the controller 62 instructs rotation of the panels 14 to a different fixed angular position, to minimize wind loads. Data on the orientation of the panels and permissible wind speed limits would be static data loaded into the controller 62 as an override command, that would take priority over all other inputs if the wind could endanger the system. In all other respects, system 60 may be operated identically in an open field structure and in a greenhouse.

It is expected that during the life of a patent maturing from this application many relevant photovoltaic materials and many relevant types of sensors will be developed that are suitable for the functions described herein, and the scope of the terms photovoltaic material and sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for optimizing angular positioning of photovoltaic panels in a greenhouse, comprising:
    at least one arrangement having a plurality of photovoltaic panels and configured for installation in a greenhouse having a roof supported by a plurality of support beams, comprising:
        a plurality of frames, wherein each frame comprises at least one rod and at least one photovoltaic panel mounted on a respective one of the at least one rod;
        at least one motor, each respective motor mechanically connected to rotate one or more respective rods, for bringing each photovoltaic panel to a plurality of different fixed angular positions; and
        a plurality of fittings arranged at a perimeter of the arrangement, each fitting sized and shaped to attach to at least one of the plurality of support beams, such that the arrangement is supportable exclusively by the plurality of support beams, the plurality of fittings comprising telescopic rods adjustable to different lengths and connectors attached to the telescopic rods and configured each to be located at and fitted around each of the at least one of the plurality of support beams, a controller; and a plurality of sensors, each of the plurality of sensors configured to monitor at least one of air temperature, leaf temperature, root temperature, irradiance, humidity, and carbon dioxide concentration at locations within the greenhouse and generate sensor outputs, and to provide the sensor outputs to the controller;

wherein the controller is programmed to select an optimal fixed angular position for each photovoltaic panel for promoting plant growth, based on a combination of environmental and plant conditions and the sensor outputs, and to instruct each respective motor to rotate each one or more respective rods to the selected fixed angular position, wherein the environmental and plant conditions comprise at least one member selected from the group consisting of: an opacity of the photovoltaic panels; a range of frequencies of light transmitted through the photovoltaic panels; a current date; a current time of day; a type of crop that is being grown; a date of planting of said crop; a geographic location of the greenhouse; a shape of the greenhouse; a material of a cover of the greenhouse; and a transmittance of the cover of the greenhouse.

2. The arrangement of claim 1, wherein the frames are arranged as cross ties between different arches of the support beams, to thereby provide increased structural support for the framing members.

3. The arrangement of claim 1, wherein each of the frames and the rods is made of aluminum.

4. The arrangement of claim 1, wherein each respective motor is capable of maintaining the one or more respective rods at up to fifty different fixed angular positions.

5. The system of claim 1, wherein the plurality of sensors comprise:

a plurality of sensor units mounted at different heights on vertical posts within the greenhouse, said sensor units configured to monitor air temperature, leaf temperature, irradiance, humidity, and carbon dioxide concentration; and a plurality of root temperature sensors arranged at roots of plants within the greenhouse and configured to monitor root temperature.

6. The system of claim 5, further comprising a fan-based ventilation system, wherein the controller is configured to instruct the ventilation system to circulate air within the greenhouse when a temperature sensed by sensor units above plant level is greater than a temperature sensed by sensor units at plant level and when temperature at plant level is below a predefined optimum temperature for plant growth.

7. The system of claim 1, wherein the sensor outputs comprise at least one member selected from the group consisting of: irradiance in various parts of the greenhouse; temperature in various parts of the greenhouse; humidity in various parts of the greenhouse; leaf temperature in various parts of the greenhouse; root temperature in various parts of the greenhouse; and carbon dioxide concentration in various parts of the greenhouse.

8. The system of claim 1, wherein, regardless of a status of the sensor outputs, the controller is configured to select a fixed angular position of each of the panels so that each plant within the greenhouse receives a predetermined minimum Daily Light Integral (DLI).

9. The system of claim 8, wherein, if the controller determines that a plant did not receive its predetermined minimum DLI in a particular day, the controller is configured to direct the fixed angular position of the panels in at least one subsequent day so as to exceed the predetermined minimum DLI for that subsequent day, so as to achieve cumulatively an average minimum DLI for a series of days.

10. The system of claim 1, further comprising a fan-based ventilation system, wherein the controller is configured to instruct the ventilation system to extract hot air from the top of the greenhouse when a temperature within the greenhouse surpasses a predetermined temperature, and to inject air from outside the greenhouse to an interior of the greenhouse when carbon dioxide levels within the greenhouse decline below a predetermined level, wherein the predetermined temperature and predetermined level are determined based on the environmental and plant conditions.

11. The system of claim 10, wherein the environmental and plant conditions include maximum and minimum suitable ranges of temperature and irradiance for each specific growth phase of a crop, and the controller is configured to adjust a level of irradiance of each crop through rotation of the panels, and to adjust a level of temperature of each crop through rotation of the panels and operation of the ventilation system, so as to maintain the temperature and irradiance levels within the suitable ranges.

12. The system of claim 1, wherein, as a secondary consideration to optimizing the angular position of each panel for promoting plant growth, the controller is configured to adjust the fixed angular position of each panel so as to track movement of the sun.

13. A method of optimizing angular positioning of photovoltaic panels in a structure for cultivating plant growth, wherein the structure comprises a plurality of frames, each frame comprising at least one rod and at least one photovoltaic panel mounted on a respective one of the at least one rod, and at least one motor, each respective motor configured for rotating one or more respective rods and for maintaining the one or more respective rods in a plurality of fixed angular positions, and a plurality of fittings arranged at a perimeter of the structure, each fitting sized and shaped to attach to at least one of a plurality of support beams of a roof of a greenhouse, such that the structure is supportable exclusively by the plurality of support beams, the plurality of fittings comprising telescopic rods adjustable to different lengths and connectors attached to the telescopic rods and configured each to be located at and fitted around each of the at least one of the plurality of support beams, the method comprising:

monitoring, with a plurality of sensors within the structure, at least one of air temperature, leaf temperature, root temperature, irradiance, humidity, and carbon dioxide concentration at locations within the structure, to thereby generate sensor outputs;

providing the sensor outputs to a controller;

selecting, with the controller, an optimal fixed angular position for each photovoltaic panel for promoting plant growth, based on a combination of environmental and plant conditions and the sensor outputs, wherein the environmental and plant conditions comprise at least one member selected from the group consisting of: an opacity of the photovoltaic panels; a range of frequencies of light transmitted through the photovoltaic panels; a current date; a current time of day; a type of crop that is being grown; a date of planting of said crop; a geographic location of the greenhouse; a shape of the greenhouse; a material of a cover of the greenhouse; and a transmittance of the cover of the greenhouse; and instructing at least one respective motor to rotate the one or more respective rods to the selected fixed angular position.

14. The method of claim 13, wherein the environmental and plant conditions comprise at least one member selected from the group consisting of: an opacity of the photovoltaic panels; a range of frequencies of light let through by the photovoltaic panels; a current date; a current time of day; a kind of crop that is being grown; a date of planting of said crop; a geographic location of the structure; a shape of the structure; a material of a cover of the structure; and a transmittance of the cover of the structure.

15. The method of claim 13, wherein the sensor outputs comprise at least one member selected from the group consisting of: irradiance in various parts of the structure, temperature in various parts of the structure, humidity in various parts of the structure; leaf temperature in various parts of the structure; root temperature in various parts of the structure, and carbon dioxide concentration in various parts of the structure.

16. The method of claim 13, further comprising, regardless of a status of the sensor outputs, selecting a fixed angular position of each of the panels so that each plant within the structure receives a predetermined minimum Daily Light Integral (DLI).

17. The method of claim 16, wherein, if the controller determines that a plant did not receive its predetermined minimum DLI in a particular day, directing the fixed angular position of the panels in at least one subsequent day so as to exceed the predetermined minimum DLI for that subsequent day, so as to achieve cumulatively an average minimum DLI for a series of days.

18. The method of claim 13, wherein the greenhouse comprises a fan-based ventilation system, and the method further comprises instructing the ventilation system to extract hot air from the top of the greenhouse when a temperature within the greenhouse surpasses a predetermined temperature, and to inject air from outside the greenhouse to an interior of the greenhouse when carbon dioxide levels within the greenhouse decline below a predetermined level, wherein the predetermined temperature and predetermined level are determined based on the environmental and plant conditions.

* * * * *